(12) United States Patent
Vornehm et al.

(10) Patent No.: US 6,832,147 B2
(45) Date of Patent: Dec. 14, 2004

(54) METHOD AND APPARATUS FOR CONTROLLING A VEHICLE WITH A GEAR-SHIFT TRANSMISSION

(75) Inventors: Martin Vornehm, Bühl (DE); Thomas Jäger, Bühl (DE); Klaus Henneberger, Bühl (DE); Wolfgang Reik, Bühl (DE); Robert Fischer, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 635 days.

(21) Appl. No.: 09/863,099

(22) Filed: May 18, 2001

(65) Prior Publication Data

US 2002/0049118 A1 Apr. 25, 2002

Related U.S. Application Data

(63) Continuation of application No. PCT/DE99/03634, filed on Nov. 12, 1999.

(30) Foreign Application Priority Data

Nov. 18, 1998 (DE) .......................................... 198 53 112

(51) Int. Cl.⁷ .............................................. G06F 17/00
(52) U.S. Cl. ............................. 701/54; 701/51; 701/66; 701/58; 701/93; 701/53; 701/95; 477/108; 477/148; 477/149; 477/110; 477/120; 477/121; 123/349; 180/170
(58) Field of Search .............................. 701/51, 53, 54, 701/58, 66, 93, 95; 477/108, 148, 149, 110, 120, 121; 123/349; 180/170

(56) References Cited

U.S. PATENT DOCUMENTS

| | | | | |
|---|---|---|---|---|
| 4,819,163 A | * | 4/1989 | Shimizu et al. | 701/101 |
| 4,870,584 A | * | 9/1989 | Etoh et al. | 701/95 |
| 5,216,915 A | * | 6/1993 | Sakamoto | 73/117.3 |
| 5,478,293 A | * | 12/1995 | Yonezawa | 477/110 |
| 5,484,350 A | * | 1/1996 | Ishikawa et al. | 477/97 |
| 5,685,801 A | * | 11/1997 | Benford et al. | 477/108 |
| 6,023,647 A | * | 2/2000 | Saito et al. | 701/57 |
| 6,073,509 A | * | 6/2000 | Salecker et al. | 74/335 |
| 6,259,983 B1 | * | 7/2001 | Tsutsui et al. | 701/51 |

FOREIGN PATENT DOCUMENTS

| | | |
|---|---|---|
| AT | 392 763 B | 6/1991 |
| DE | 35 42 624 A 1 | 6/1987 |
| DE | 43 27 906 A 1 | 2/1995 |
| DE | 43 33 589 A 1 | 4/1995 |
| DE | 197 09 417 A 1 | 10/1997 |
| DE | 197 26 724 A 1 | 11/1998 |
| DE | 198 56 587 A 1 | 6/1999 |
| DE | 198 57 112 A 1 | 6/1999 |
| DE | 198 02 736 A 1 | 7/1999 |
| EP | 0 499160 A 2 | 10/1991 |
| JP | 40623309 A * | 8/1994 |
| WO | WO 89/10282 | 11/1989 |

OTHER PUBLICATIONS

Bader C; *Elektronische Antriebssteuerung Fuer Nutzfahrzeuge*, VDI Z, DE, CDI Verlag GmbH, Dusseldorf Bd. 143, Nr. Special, Mar. 1, 1992.

* cited by examiner

Primary Examiner—William A. Cuchlinski, Jr.
Assistant Examiner—McDieunel Marc
(74) Attorney, Agent, or Firm—Darby & Darby

(57) ABSTRACT

In a vehicle with a gear-shift transmission of a kind that requires a torque-free state to shift gears, the riding comfort is improved by a method of shifting gears where a gear shift is preceded by the steps of:

reducing the vehicle acceleration at a time t1 from an existing level (1) to a first acceleration level (3), maintaining the vehicle acceleration at the reduced level (3) for a predetermined time interval, and at the end point t3 of the predetermined time interval, reducing the acceleration further to a second acceleration level that is lower than the first level.

43 Claims, 7 Drawing Sheets

METHOD AND APPARATUS FOR CONTROLLING A VEHICLE WITH A GEAR-SHIFT TRANSMISSION

This application is a continuation of international application Ser. No. PCT/DE99/03634, filed Nov. 12, 1999.

The present invention relates to a method of controlling a vehicle that is equipped with an engine, a clutch, and a gear-shift transmission, and it also relates to a vehicle equipped with a controlling apparatus or control device that works according to the method.

Many contemporary motor vehicles have transmissions with to several gear levels shifted manually by the driver of the vehicle. Likewise known is an automatic transmission that shifts in steps, but the latter type of transmission has the disadvantage of a higher cost in comparison to the manually shifted transmission.

The automatic transmission has the advantage of offering a higher level of comfort, but it also involves a higher level of technical complexity that puts the automatic transmission at a cost disadvantage. The cost factor is considered to be the main reason why only a small minority of cars of relatively low engine power are equipped with automatically shifting transmissions, or why some of the small cars are not even available with automatic transmissions. However, with the ever increasing volume of traffic, large and small cars alike are exposed to constantly changing traffic situations where the changes in speed require frequent gear shifts.

Some efforts are being undertaken to automate the operation of gear-shift transmissions in order to provide a higher level of driving comfort to users of motor vehicles that are not equipped with an automatic transmission. The approach in this development is based on the manual transmission, which will also be referred to as gear-shift transmission. A principal difference between an automated gear-shift transmission and an automatic transmission (with discrete speed levels) is that the latter can be shifted from one speed level to another without an interruption in the tractive force, while an automated gear-shift transmission requires the flow of torque from the engine through the clutch to the transmission to be interrupted during the gear-shifting process.

An automated gear-shift transmission allows gear levels to be changed automatically, but there is a time gap in traction during the shift process, in contrast to a multi-speed automatic transmission which can sustain a torque load during a shift. The gap in the tractive force becomes more noticeable to the driver, the higher the amount of traction that is being interrupted. After shifting gears, the engine has to build up traction again in order to accelerate the vehicle, so that the user of the motor vehicle will experience the gap in the tractive force as a change in the acceleration of the vehicle.

OBJECT OF THE INVENTION

The present invention therefore aims in a broad and general sense to provide a method of controlling a vehicle that is equipped with a gear-shift transmission, so that the vehicle will shift gears with a high level of comfort. The invention also has the objective of providing a control device to perform the control function according to the inventive method.

SUMMARY OF THE INVENTION

The method proposed by the present invention as a solution to the problem stated above involves the following steps:

a) detecting when a gear-shift is about to be carried out in the transmission:
b) detecting the acceleration of the vehicle by means of a control device, and
c) reducing the acceleration of the vehicle to a first lower level of acceleration prior to the gear-shifting process.

The driver of a vehicle that is equipped with an automated gear-shift transmission can select an operating mode in which gears are shifted automatically. A control device can perform the shifting process by interrupting the flow of torque from the engine and by actuating the clutch and transmission according to the gear-shifting process that is to be performed. The driver of the motor vehicle will experience the gear-shifting process and the associated gap in vehicle traction as a fluctuation in the acceleration of the vehicle.

The invention therefore provides a method of controlling a vehicle equipped with a gear-shift transmission that is coupled to an engine by way of a clutch. According to the inventive concept, the acceleration of the vehicle is detected by a control device; and prior to initiating a gear-shifting process, the acceleration is lowered to a first acceleration level. The method according to the invention provides that prior to a gear change, the current acceleration of the vehicle is determined, e.g., based on a sensor signal by which the control device is informed of the engine torque or the acceleration, and that prior to a gear change, appropriate measures are taken to reduce the vehicle acceleration from the detected actual acceleration to a lower level of acceleration also referred to herein as the first acceleration level. According to the invention, the intent is to maintain the first acceleration level substantially unchanged for a prescribed time interval. Thus, the acceleration is lowered from the amount that was measured prior to initiating the gear shift and is then kept substantially constant at the lower level for a certain time interval.

Based on an analysis of the relevant human factors, the driver of a motor vehicle will take a relaxed body posture to the extent possible while driving the vehicle, in particular by attempting to carry his head in a balanced equilibrium position on the neck. If an unbalancing force is acting on the driver's head, he will react by attempting to return his head to a position of equilibrium. In general, the processes that take place in this situation are not consciously experienced by the driver of a vehicle. When the head is in a balanced equilibrium position on the neck, the horizontal force components acting at the center of mass of the head will cancel each other, so that there is no resultant force that would tend to push the head out of its equilibrium. When a destabilizing resultant force occurs, e.g., due to a change in the dynamic situation of the vehicle, a person will react by attempting to return his head to the equilibrium position that existed before the onset of the destabilizing force.

The method according to the invention makes use of the foregoing observation. As a result of lowering the vehicle acceleration to the first acceleration level prior to performing a gear shift, the head of a driver or occupant of the vehicle is subjected to an inertial force and will as an immediate result be displaced in a forward direction out of its equilibrium position.

After the vehicle acceleration has been lowered to the first acceleration level, the latter level is kept substantially unchanged for a predetermined time interval. During this time interval, the driver will spontaneously (i.e., without being aware of the effort) attempt to restore his head to its equilibrium position. During this equilibrium-restoring phase, the acceleration of the vehicle remains substantially constant. Further according to the inventive method, before the driver has completed the process of restoring the equilibrium position of his head, the vehicle acceleration is lowered to a second acceleration level that is lower than the first level. The driver has no negative sensation of this further reduction in vehicle acceleration, because his sense of balance has already been primed to re-equilibrate his head in response to the first reduction of the acceleration.

According to the invention, the time interval during which the first acceleration level is kept substantially constant is longer than 100 to 200 milliseconds, the preferred interval being 200 to 600 milliseconds, which may be narrowed down to 300 to 500 milliseconds.

During this time interval, the driver will have returned his head about halfway towards the previous equilibrium position, i.e., by half the amount of the initial displacement. Thus, being in the middle of the re-equilibrating phase, the driver will experience no negative sensation from the additional reduction in vehicle acceleration.

According to the invention, a proposed magnitude for the first acceleration level is 40% to 70% of the vehicle acceleration as determined in the first step of the inventive method, which could be as high as the maximum possible acceleration of the vehicle.

According to a modified version of the inventive method, the time phase of the first acceleration level can include a short dip to near zero for a time interval of 50 to 100 milliseconds to unsettle the driver's head from its equilibrium and thereby induce the aforementioned reaction of the driver to restore the previous state of equilibrium. Following the short dip in vehicle acceleration, the acceleration is raised back to the first level, so that the return movement of the driver's head to its equilibrium position occurs mostly during the phase after the dip in the first level. While the return movement of the driver's head is still in progress, the acceleration is cut back to the second acceleration level. With the modified method just described, the pronounced dip to near zero during the time phase of the first acceleration level serves to trigger a strong inertial response that causes the driver's head to move forward. The pronounced dip in acceleration is followed by a short-term increase to the first acceleration level which, in accordance with the invention, is kept substantially constant for a prescribed time period, which helps the driver to return his head to the equilibrium position. About halfway in the return movement of the driver's head, the acceleration is lowered to the second acceleration level. The second lowering of the acceleration will not cause any disagreeable sensation to the driver, because he has already tightened the muscles that hold and move the head. Thus, the vehicle acceleration overall varies according to a time pattern where the head of the driver is no longer jolted into an uncomfortable nodding movement.

According to the inventive method, the changes in vehicle acceleration are accomplished through a control of the engine torque. Prior to interrupting the traction in the process of shifting gears, the torque delivered by the engine is lowered to a first torque level that is lower than the amount of engine torque that corresponds to the acceleration that was determined in the first step of the inventive method. The control device maintains the engine torque at the aforementioned first level for a predetermined amount of time.

It is also possible to use a control pattern where during the predetermined time interval the amount of engine torque varies in a manner where the mean value of the torque during the time interval is lower than the amount of torque that would correspond to the previously measured acceleration. In an advantageous mode of variation, the engine torque is lowered over a time interval of about 200 to 800 milliseconds from an initial level to an ending level where the gear shift is started. During the time period of about 200 to 800 milliseconds, the engine torque is lowered from the level that corresponds to the previously measured acceleration to a first torque level. The decrease in acceleration causes the driver's head to move from its equilibrium position which, in turn, triggers a response by the driver to return his head from a displaced position back to the equilibrium position. During the phase where the return to the equilibrium position is still in progress, the method according to the invention prescribes a further reduction of the engine torque to a second torque level that is lower than the first torque level. The driver will have no negative or uncomfortable sensation from the additional cutback in engine torque, because is occurs while the driver is in the process of returning his head from the displaced position to the equilibrium position. According to an advantageous embodiment of the invention, the two-step process of lowering the engine torque fills a time interval of about 200 to 800 milliseconds, which is followed by the gear-changing process.

To summarize the foregoing discussion, the invention provides a method suitable for implementation by means of a control device to control a vehicle with a gear-shift transmission that has to be in a torque-free state to shift gears. The vehicle has an engine coupled to the gear-shift transmission through a clutch. The method includes the steps of a) detecting that a gear shift is called for, b) determining the amount of engine torque that is present before initiating the shift, c) lowering the engine torque from the level determined in step b) to a first torque level, d) holding the engine torque at the first torque level for a predetermined time interval, e) after the predetermined time interval, lowering the engine torque further, before f) initiating the gear shift.

According to a further developed embodiment of the invention, the first torque level is maintained substantially unchanged for the length of time that the user of the vehicle needs to return his head about halfway after the nodding that was caused by the lowering of the torque to the first torque level. As explained above, the invention proposes to achieve the two-step reduction of the acceleration through a corresponding two-step reduction of the engine torque. In a vehicle equipped with an automated gear-shift transmission, the clutch that couples the transmission to the engine has to be disengaged before shifting gears. To prevent the engine from racing out of control after the clutch has been disengaged, the control device can be employed to take control over the engine torque, for example by controlling the throttle valve to change the amount of air supplied to the engine, or through an appropriate control of the ignition timing, or by controlling the rate at which fuel is supplied to the engine.

With the development efforts in the automobile industry to increase the efficiency of all components of the drive train in order to save fuel, one can observe a general trend to minimize the amount of damping in the individual components of the drive train. However, this makes the vehicle more prone to drive train oscillations which are irritating to the occupants of the vehicle and are therefore found to be detrimental to the riding comfort. Drive train oscillations manifest themselves as a back-and-forth jerking, shaking or jolting movement in the lengthwise direction of the vehicle. The invention therefore proposes a concept whereby the length of time spent at the reduced engine torque (i.e., at the first torque level) is to determined dependent on properties of the drive train of the vehicle. In this context, the length of time spent at the reduced engine torque is the amount of time between the first and the second cutback of the engine torque. The drive train of the vehicle first of all includes the engine itself, characterized in particular by its mass moment of inertia. In addition to the engine, the drive train includes all components of the vehicle that participate in transmitting power from the engine to the road surface such as, e.g., the clutch with its individual components, the transmission input shaft, the transmission with all of its components, the transmission output shaft, in some cases a drive shaft with universal joints, the axle gear assembly, the driving shafts and the driven wheels. Collectively, all drive train components downstream of the transmission, i.e., on the output side of the transmission, can be characterized by their combined elasticity, which will be referred to as the output-side elasticity.

The invention proposes a concept whereby the length of time spent at the reduced engine torque is determined dependent on the oscillation behavior of the drive train of the vehicle.

According to a further developed embodiment of the invention, the length of time spent at the reduced engine torque is set dependent on the period of the drive train oscillations of the vehicle, i.e., the oscillation period of the aforementioned back-and-forth jolting movement. The period of the drive train oscillations is a characteristic parameter specific to each gear level. The shortest oscillation period occurs in the highest gear level, and the longest period occurs in the lowest gear level. This is best understood by considering the drive train as a spring oscillator in which the aforementioned output-side elasticity is equated to a spring and the mass moment of inertia of the engine is equated to the inertial mass of the spring oscillator. With the spring and the inertial mass in this case being coupled through one of the different gear levels of the transmission, the resulting spring oscillator is stiffest in the highest gear because the engine performs the smallest number of rotations for each rotation at the output side of the transmission. The period of the drive train oscillation is to a large extent determined by the mass moment of inertia of the engine and by the output-side elasticity.

The invention therefore provides the concept that the length of time spent at the reduced engine torque is set dependent on the period of the drive train oscillation. It is further advantageous to also consider the current engine torque (as measured or detected) in the determination of the length of time spent at the reduced engine torque. In a further developed embodiment of the invention, the interval at the reduced engine torque is determined dependent on the detected current engine torque and on a length of time corresponding substantially to one-half of the gear-specific period of drive train oscillation.

To execute the method just described, the control device (having determined that a gear shift needs to be carried out) sends a signal to the engine to effect a first cutback of the engine torque dependent on the detected current engine torque level and also dependent on the approximate length of a half-period of the drive train oscillation. The signal that the control device sends to the engine is a control target for the engine torque. Due to factors inherent in the system, the engine follows the target command with a certain time lag. It is therefore advantageous to allow a predetermined amount of waiting time elapse after sending the target signal, to allow the actual engine torque to fall to, e.g., 80% of the initially detected torque level. This is followed by a further waiting interval corresponding to the gear-specific amount of time for a half-period of the drive train oscillation, whereupon the control device issues a signal for a further cutback of the engine torque, i.e., another control target for the engine torque. The time from the signal for the first cutback to the signal for the second cutback of the engine torque is thus determined based on the gear-specific time interval for a half-period of the drive train oscillation and another time interval as required to allow the engine torque to fall by about 20%.

Also as a part of the method, the invention provides that the control device issues a signal to a clutch actuator device (where the clutch is, e.g., a friction clutch) to adjust the clutch torque (i.e., the torque-transmitting capacity of the clutch) so that it follows the cutbacks of the engine torque. By adapting the clutch torque to the actually delivered engine torque at each point in time, it is possible to reduce the time required for the subsequent complete disengagement of the clutch.

The invention provides that the control device signals the clutch actuator device to disengage the clutch at a point in time when the drive train elements downstream of the gear-shift transmission, i.e., the elements that contribute to the output-side elasticity, are substantially in an unbiased, tension-free state. It is advantageous to allow some lead time in the actuator signal to compensate for the processing time of the control device and the inertia of the actuator. If the time of clutch disengagement were not controlled, the aforementioned drive train elements could be elastically biased by the torque that is transmitted through them. The release of the elastic tension at the disengagement of the clutch would cause a change in the rpm rate of the clutch disc, which would lead to an oscillation. Thus, an elastic bias torque or state of tension caused by the output-side elasticity in the drive train may be experienced by the occupants of the vehicle as an uncomfortable jolt during the disengagement of the clutch.

The invention also provides that the control device sends a signal to an actuator device of the automated gear-shift transmission to shift out of gear at a point in time when the drive train elements downstream of the gear-shift transmission, i.e., the elements that contribute to the output-side elasticity, are substantially in an unbiased, tension-free state. It is advantageous to allow some lead time in the actuator signal to compensate for the processing time of the control device and the inertia of the actuator. If the time of shifting out of gear were not controlled and if the aforementioned drive train elements were elastically biased, the out-shifting, i.e., the disengagement of a sliding sleeve of the transmission from a spline, would require a large amount of force. The release of the elastic tension at the disengagement of the tooth profiles causes a change in the rpm rate of internal components of the transmission, which could even involve the risk of damaging the affected components.

As stated previously, the invention provides a method suitable for implementation by means of a control device to control a vehicle with a gear-shift transmission, an engine and a clutch. The method has the steps of a) detecting that a gear shift is to be performed, b) determining the amount of engine torque that is present before initiating the shift, c) lowering the engine torque from the level determined in step b) to a first torque level, d) holding the engine torque at the first torque level for a predetermined time interval, e) after the predetermined time interval, lowering the engine torque further, before f) initiating the gear shift.

As discussed above, before initiating the gear shift in the foregoing step f), the clutch is taken out of engagement. In the process of disengaging and re-engaging, the clutch goes through slip phases. The slipping clutch causes oscillations in the drive train, which will herein be referred to as chatter vibrations. Chatter vibrations occur in cases where oscillatory torque fluctuations induced by the slippage of the clutch coincide with resonance frequencies of the drive train as the latter is dynamically interrupted by the clutch. It has been found that in case of an elastic bias torque in the output-side elements of the drive train, the resulting rpm change at the disengagement of the clutch is experienced as an uncomfortable jolt only if the release of the elastic bias torque causes an oscillation that extends over more than one-fourth of an oscillation period, i.e., if the clutch disengagement takes longer than one-fourth of a chatter-vibration period. It has also been found that a loss of riding comfort is experienced if the time interval for the cutback of the engine torque is shorter than the period of the drive train oscillation, but that the drive train oscillation itself causes an adverse sensation only if it lasts longer than one-fourth of a period of the drive train oscillation.

The invention therefore provides that the control device sends a signal to the engine to lower the engine torque in such a manner that the length of time spent at the reduced engine torque corresponds substantially to one-fourth of the period of the oscillation period for the currently engaged gear level or, alternatively, in a manner where the time period for lowering the engine torque is either longer than the period of the drive train oscillation or shorter than one-fourth of the period of the drive train oscillation, while at the same time the interval for disengaging the clutch corresponds substantially to one-fourth of a period of the chatter vibration.

The invention also includes a control device that performs the method of the foregoing description which is used to control a vehicle equipped with a gear-shift transmission that is coupled to an engine by way of a clutch. The control device is equipped to detect when a gear shift is needed in the transmission, to also detect the current acceleration of the vehicle, and to perform the functions involved in lowering the acceleration to a first acceleration level prior to the gear-shifting process. According to an advantageous embodiment of the invention, the control devices keeps the first acceleration level substantially constant during a predetermined time period.

According to another embodiment, the control device is designed to produce a first acceleration level that varies over the predetermined time period in a manner where the mean value of the reduced acceleration during the predetermined time period is smaller than the initially detected acceleration of the vehicle. The control device is further designed so that it can lower the vehicle acceleration to a second acceleration level that is lower than the first acceleration level.

The control device can change the acceleration of the vehicle by controlling the torque delivered by the engine. In specific terms, this means that the control device is designed to control the ignition timing of the engine to effect a change in vehicle acceleration. As another possibility, the control device can control the fuel supply to the engine as a way of managing the engine torque. In addition or as an alternative, the control device could also be equipped to control the air intake of the engine in order to influence the acceleration of the vehicle.

To control the amount of torque delivered by the engine, the control device is equipped to send a signal to the engine to lower the torque in such a manner that the length of time spent at a reduced engine torque prior to disengaging the clutch corresponds to substantially one-fourth of a period of the drive train oscillation which, as discussed above, depends on the gear that is currently set in the transmission. As alternative possibilities, the length of time spent at a reduced engine torque prior to disengaging the clutch may be longer than a full period of drive train oscillation or shorter than one-fourth of a period of drive train oscillation, while the time interval for taking the clutch out of engagement substantially corresponds to one-fourth of a period of the chatter vibration.

The invention also covers a vehicle with a gear-shifting transmission that is preferably automated and is coupled to the engine of the motor vehicle through a friction clutch. The vehicle has a control device as described above. A driver of the motor vehicle can select an operating mode of the control device where the latter controls a clutch actuator device and a transmission actuator device, so that the gear changes are performed automatically and the riding comfort is not negatively affected by drive train oscillations of the vehicle.

In a known type of vehicle with a manual shift transmission, the driver and passengers are alerted about an impending gear shift at the time when the driver closes his grip on the shift lever to perform a manual gear change. Having been alerted, the occupants will no longer find the gap in vehicle traction to be noticeably uncomfortable when the clutch is disengaged.

According to an advantageous embodiment of the invention, the vehicle is equipped with an indicator device that alerts the user of the vehicle when a gear shift is imminent. The indicator device can be an acoustical and/or optical and/or haptic (tactile) display. The indicator device alerts the user of the vehicle with the automated gear-shift transmission when a gear shift is imminent, so that he will not be surprised by the subsequent interruption in the traction of the vehicle. The indicator device can be modified so that it will also indicate the targeted new gear level that the transmission will subsequently be shifted to. This is advantageous in certain applications, e.g., when an intermediate gear level is to be skipped in an up-shift.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed description of the invention is based on the attached drawing, in which.

DETAILED DESCRIPTION OF PREFERRED EMBODIMENTS

Figure 1:
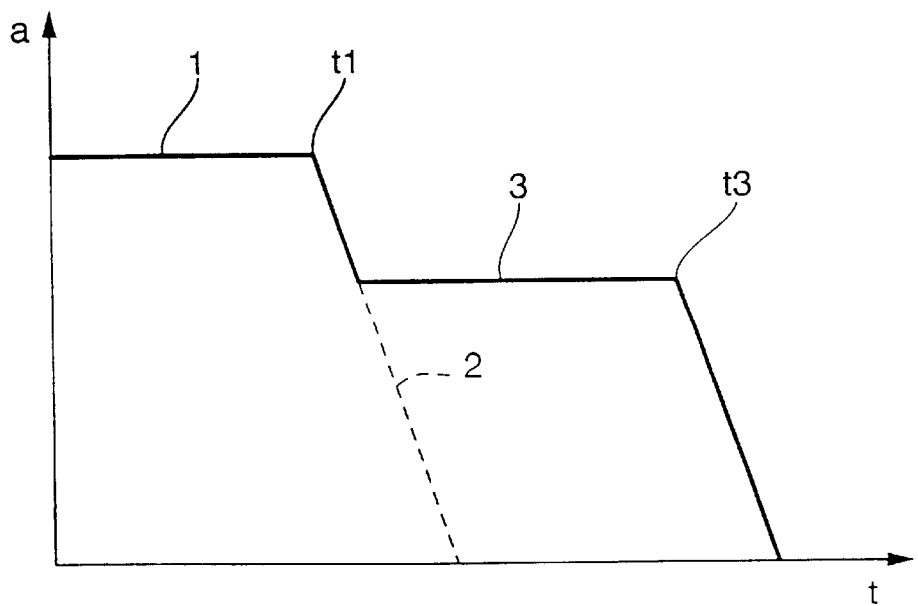
FIG. 1 represents a schematic graph of vehicle acceleration vs. time, where the acceleration is lowered in two steps.

FIG. 1 represents a graph of acceleration vs. time in a two-step process of lowering the acceleration to achieve a comfortable way of cutting back the acceleration during a gear Is change in an automated gear-shift transmission. The time profile illustrated belongs to an up-shift during a travel phase when there is traction on the driving wheels of the vehicle. A vehicle (not shown in the drawings) with an automated gear-shift transmission, a clutch, and a combustion engine is operated in an automatic mode, i.e., in a driver-selectable operating mode in which gear changes are performed automatically.

At the beginning of the illustrated time window, the driver is holding the gas pedal in a position corresponding to a certain level of acceleration (identified by the numeral 1 in FIG. 1) as the vehicle is running, e.g., in first gear. This amount of acceleration is detected by the control device. The control device also finds that the transmission needs to be shifted into second gear at this time, because a predetermined rpm rate of the engine (stored as a shift-strategy parameter) will be reached within a short time. To perform an automated gear shift, the traction of the engine has to be interrupted. Before the present invention, a known procedure was to cut back the acceleration of the vehicle in a single step as represented by the broken line 2 in the time graph of FIG. 1.

Figure 3:
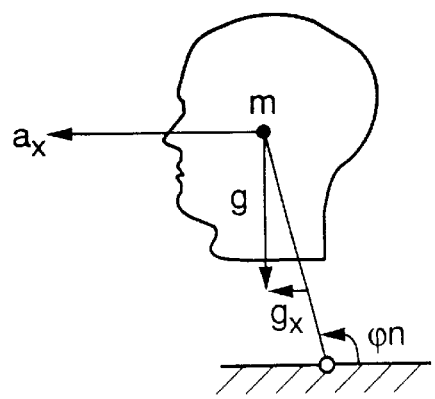
FIG. 3 illustrates the inertial forces acting on the head of a driver as a result of a vehicle acceleration.

Lowering the acceleration of the vehicle in a single step causes a strong nodding movement of the driver's head during the cutback in acceleration. FIG. 3 illustrates in a schematic manner the head of the driver of the vehicle, where m signifies the center of mass, $a_x$ signifies the acceleration component of the driver's head in relation to the vehicle as the absolute acceleration of the vehicle is cut back. The forces acting on the driver's head are the weight force G and the inertial force $G_x$. The latter exerts a forward pull on the driver's head, so that his neck will be inclined forward at the indicated neck angle φn.

With the single-step cutback in acceleration as indicated by the broken line 2, the head of the driver is subject to a relative acceleration (in relation to the vehicle) which points in the travel direction of the vehicle.

Figure 4:
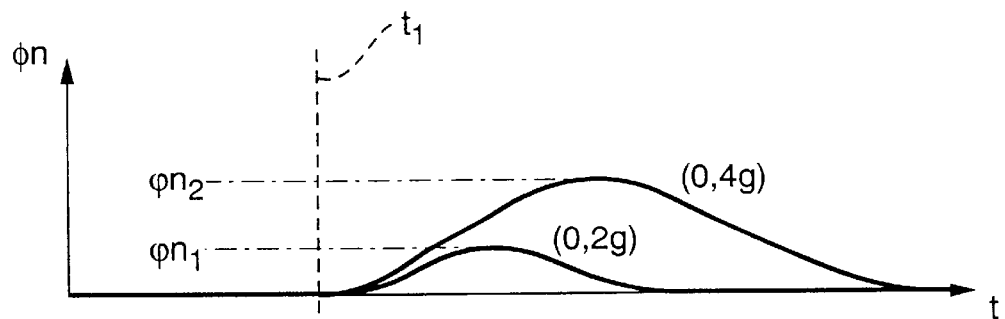
FIG. 4 represents the angle of the driver's neck position vs. time for two different step changes in vehicle acceleration.
Figure 5:
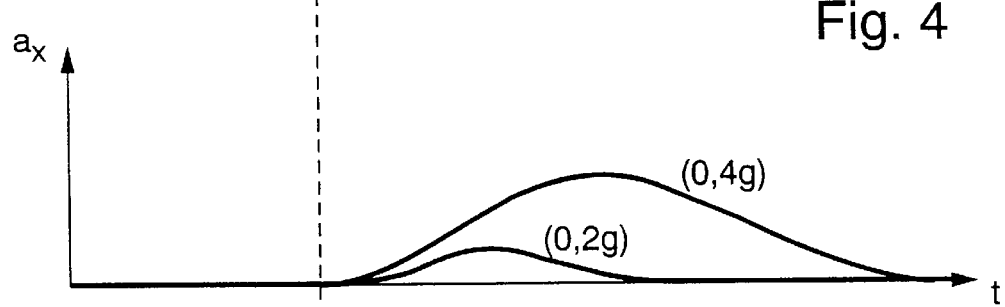
FIG. 5 represents the acceleration of the drivers head vs. time for two different step changes in vehicle acceleration.

FIGS. 4 and 5 represent time graphs of the neck angle $\phi_n$ and the acceleration $a_x$ for two specific cases where the vehicle acceleration is cut back in a single step of 0.2 g and 0.4 g, respectively. At the time $t_1$, the vehicle acceleration is cut back from the level 1 to zero in a single step so that, as a result, the driver's head will react with a nodding movement in the travel direction of the vehicle. The step change in vehicle acceleration depends on the level of acceleration that was selected by the driver and was present at the time $t_1$. The acceleration amounts of 0.2 g and 0.4 g in the drawing illustrate the fact that the driver's head is displaced by an amount (in terms of the neck angle φn) that is smaller for a single-step cutback in vehicle acceleration of 0.2 g than for 0.4 g. Furthermore, as can be seen by comparing the respective neck angles $\phi n_1$ and $\phi n_2$, the neck angle φn increases by a more than proportionate amount in relation to the vehicle acceleration. In other words, if the driver has selected a high level of vehicle acceleration, the single-step cutback of the acceleration will cause a strong change in the neck angle on which the driver will find uncomfortable, because he will have to expend a correspondingly large amount of muscular effort to counteract the large head movement and to bring his head back into balanced equilibrium. If the vehicle acceleration is cut back in one large step, e.g., from a level of 0.4 g, the driver's head will be subjected to a relative acceleration ax as shown in the time graph of FIG. 5. With the single-step cutback in acceleration from a level of, e.g., 0.4 g, the driver will have to spend an over-proportionate amount of effort in comparison to a cutback from 0.2 g, as represented graphically by the areas under the respective curves for 0.2 g and 0.4 g.

Figure 6:
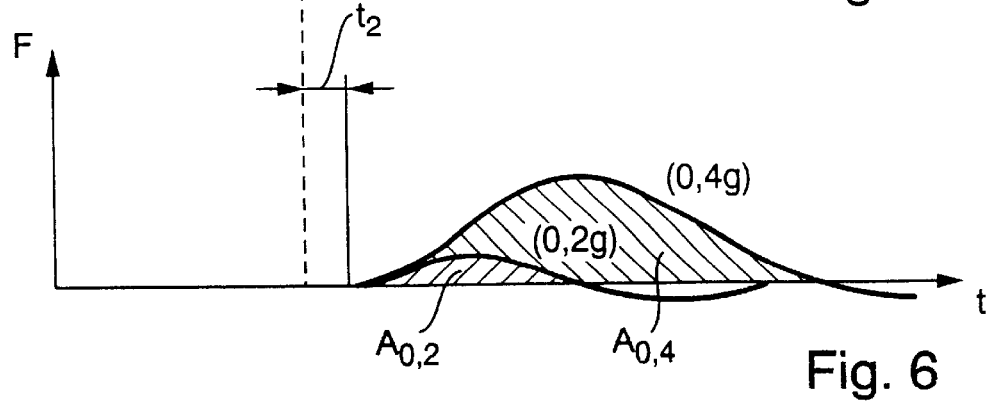
FIG. 6 represents a time graph of the horizontal force acting in the drivers neck as a result of two step changes in vehicle acceleration.

The cutback in the acceleration causes a head movement of the driver as shown in FIG. 6. After an initial movement in the direction of travel, the driver's head bounces back in an oscillatory move to the opposite side of its original position before returning to equilibrium. During the cutback in acceleration, the head of the driver involuntarily moves in the direction of travel. The driver reacts by using his muscles to reverse the head movement which causes the head to overshoot to the opposite side before returning to the original position. As shown in FIG. 6, the neck force F that has to be expended by the driver occurs with a time lag $t_2$. As may be easily concluded from FIGS. 4, 5 and 6, if the driver is accelerating the vehicle above a certain limit, the cutback of the acceleration to perform a gear shift will lead to a disproportionate increase in the effort that the driver has to expend to bring his head back into equilibrium, where the driver will find the effort as well as the nodding movement of his head uncomfortable.

Taking the time integral of the force as a measure of muscle effort, FIG. 6 compares the amounts of effort (as represented by the areas $A_{0.2}$ and $A_{0.4}$ respectively) that a driver has to expend to return his head to equilibrium if the vehicle acceleration before the cutback is 0.2 g and 0.4 g, respectively. The disproportionate increase in effort at higher levels of vehicle acceleration has thus been made evident as a comfort-diminishing factor in motor vehicles with an automated gear-shift transmission.

The invention provides a solution to the problem of driver discomfort through a method of cutting back the acceleration of the vehicle in two steps. After the current acceleration 1 (FIG. 1) has been detected by the control device, the acceleration is lowered to a first acceleration level 3 and kept substantially constant at the reduced level 3 for a predetermined amount of time. The first acceleration level 3 is lower than the initially detected acceleration 1. The lowering of the acceleration to a first level 3 before a gear shift of an automated shift transmission still causes the nodding movement of the driver's head in the direction of travel, but the time profiles of the neck angle and of the effort to return the head to its equilibrium position are markedly different from the corresponding time profiles that are found with a single-step cutback in acceleration.

Figure 7:
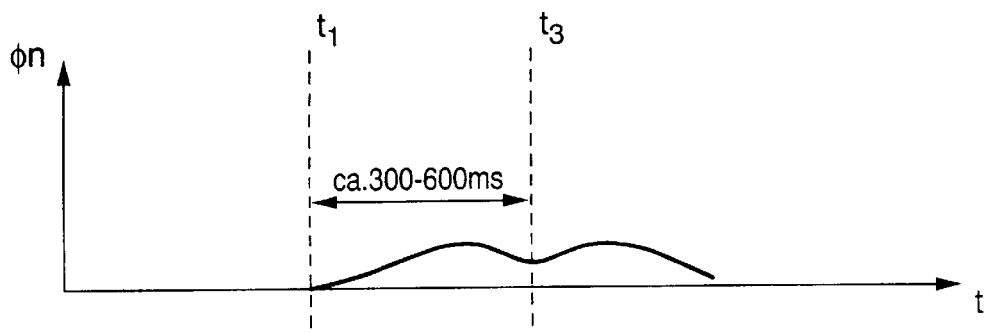
FIG. 7 represents the angle of the driver's neck position vs. time which occurs when the method according to the invention is used.

FIG. 7 represents a time graph of the neck angle $\phi n$ that is observed when the method according to the invention is used. The step of cutting back the acceleration from the initial level 1 to the reduced level 3 causes the driver's head to move by a certain amount out of the equilibrium position. The driver reacts with a muscle effort to return his head to the original equilibrium position. It has been found that about half the distance of the return movement is completed in about 300 to 600 milliseconds. The control device therefore keeps the first acceleration level 3 approximately constant for the duration of 300 to 600 milliseconds, i.e., up to the time $t_3$. At the time $t_3$, the acceleration is further cut back from the first level 3, so that the gear shift can subsequently take place. By timing the further cutback to occur at $t_3$, the inventive method achieves that at the time of the further cutback, the driver is still in the process of returning his head to the equilibrium position, i.e., moving his head in the opposite sense from the travel direction of the vehicle.

With the driver's head being already in motion at the time when the control device initiates the second cutback in vehicle acceleration, the resulting change in the neck angle $\phi n$ (FIG. 7) is no longer experienced as a negative factor, because the driver's counteracting head movement has already been activated and the head is not being jolted out of its equilibrium position as would be the case with the single-step cutback in acceleration.

Figure 8:
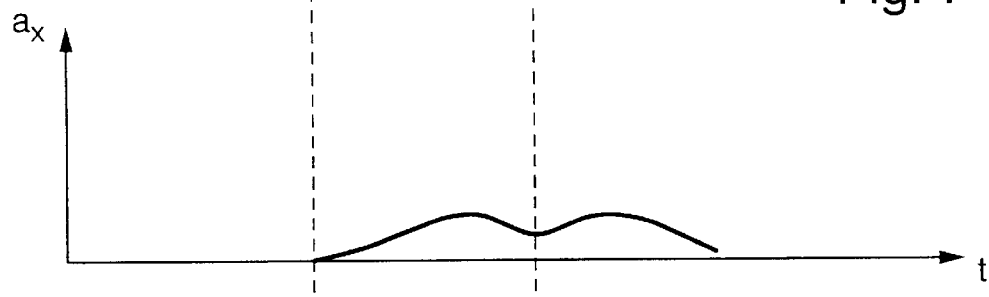
FIG. 8 represents the acceleration of the driver's head as a function of time which occurs when the method according to the invention is used.

FIG. 8 shows the time graph of the relative acceleration $a_x$ in the case of a two-step cutback in vehicle acceleration. As can easily be seen in the drawing, the acceleration $a_x$ of the driver's head sets in at the time $t_1$ and is already in a decreasing mode at the time $t_3$ when the control device initiates the further cutback in vehicle acceleration. Like the first cutback, the further cutback in vehicle acceleration again causes an acceleration $a_x$ of the driver's head. The acceleration $a_x$ subsequently fades out over a certain time period.

Figure 9:
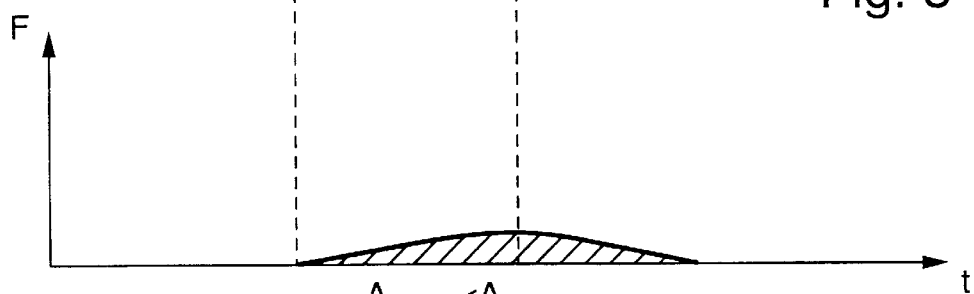
FIG. 9 represents a time graph of the horizontal force acting in the drivers neck which occurs when the method according to the invention is used.

FIG. 9 represents the time profile of the neck force F. The neck movement begins at the time $t_1$, i.e., after the initially detected vehicle acceleration has been lowered to the first acceleration level 3 by the control device. As the driver makes an effort to move his head back to the original equilibrium position, and while this return movement is still in progress, the control device initiates the second cutback in the acceleration of the vehicle at the time $t_3$. The neck force F as a function of time increases continuously from the time $t_1$ to the time $t_3$ and subsequently fades out in a continuous decrease. The surface below the curve of the neck force in FIG. 9 is only about twice as large as in the case of a single-step cutback from an acceleration of 0.2 g (area $A_{0.2}$ in FIG. 6) and significantly smaller than with a single-step cutback from 0.4 g (area $A_{0.4}$ in FIG. 6). For given equal amounts of initially detected acceleration, the amount of effort as well as the absolute amount of force F is significantly smaller with a two-step cutback in acceleration than with a single-step cutback.

The driver of a vehicle with an automated shift transmission will find that the two-step cutback of the acceleration, which can be implemented for example through a two-step cutback in engine torque, is noticeably more comfortable than a single-step cutback of the same amount.

Figure 2:
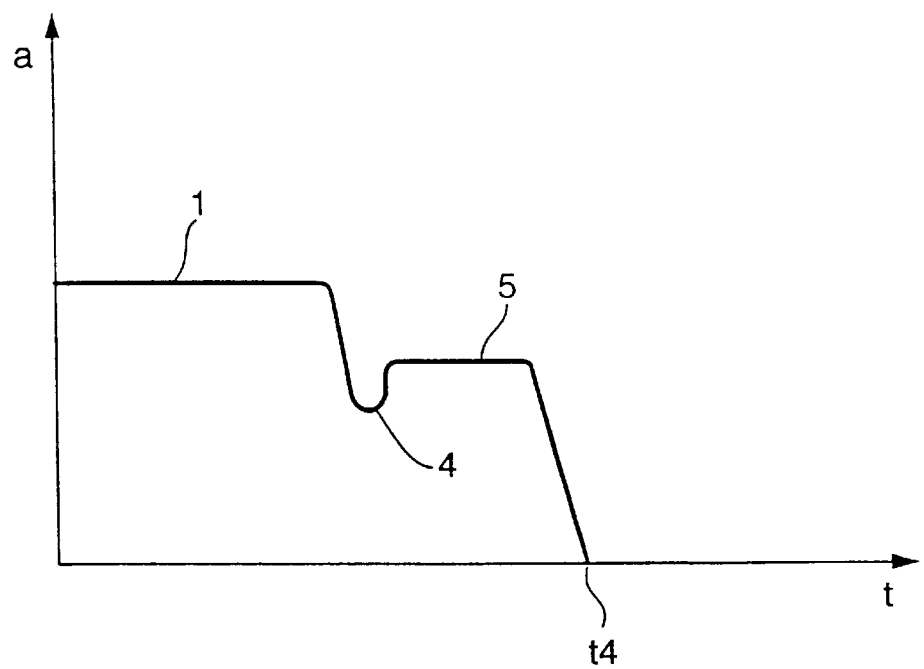
FIG. 2 represents a modified version of the acceleration profile of FIG. 1.

FIG. 2 illustrates a modified version of the method according to the invention. The control device detects the vehicle acceleration 1 prior to the gear shift, then lowers the acceleration by a certain amount, e.g., by lowering the engine torque, and subsequently increases the acceleration slightly to a first acceleration level 5. Compared to FIG. 1, the time profile of the cutback in acceleration is modified in that the time phase at the first acceleration level 5 is preceded by a short but pronounced cutback 4 in the time graph. The short cutback 4 in the acceleration has the effect of triggering the driver's head movement in the direction of travel. The driver reacts again with an effort to move his head back to the equilibrium position. When the return movement is about halfway completed, the control device initiates the further cutback in vehicle acceleration which has already been described above. The time interval from $t_1$ to $t_4$ for the modified version of the two-step cutback in engine torque as illustrated in FIG. 2 is between 200 and 800 milliseconds. The time profile of the two-step cutback in engine torque with the intermediate strong cutback as shown in FIG. 2 likewise does not cause a degree of nodding movement that the driver would find uncomfortable.

The acceleration at the cutback 4 in FIG. 2 amounts to about 40% to 70% of the maximum possible vehicle acceleration. As an alternative, the acceleration at the short cutback 4 can be lowered to near zero, or there can be two or more short cutbacks in quick succession. After the short-term cutback to the reduced acceleration value 4, a portion of the initial acceleration is restored so that the acceleration reaches the first acceleration level 5.

As discussed above, the control device can control the acceleration of the vehicle through the engine torque. The engine torque can be controlled in different ways such as, e.g., by varying the aperture of the throttle valve, by changing the ignition timing, or by controlling the fuel supply to the engine.

With the aforementioned ways of controlling the engine torque, the engine will react to the control with a time lag that is due to factors inherent in the system such as, e.g., the current degree of aperture of the throttle valve, the engine rpm rate, or the control strategy that is programmed into the control device for implementing the change in engine torque. A critical point in the time profile of the gear shift of an automated gear-shift transmission occurs at the onset of the break in vehicle traction, i.e., when the clutch is taken out of engagement. A user of a vehicle with an automated gear-shift transmission will find the gear-shifting process to be particularly jolty and abrupt if the drive train is elastically biased at the time when the clutch is taken out of engagement.

The consequences of an elastic bias torque in the drive train and the components affected by it have been discussed previously. It has been shown that the aforementioned jolts can be avoided or minimized and a comfortable disengagement of the clutch can be achieved in the two-step cutback of the acceleration, if the step changes in the time profile of the torque are synchronized precisely with the appropriate phases of the drive train oscillation.

The inventive method therefore contains provisions whereby the oscillatory properties of the drive train are taken into account in the timing of the stepwise cutbacks of the engine torque.

According to the invention, a two-step cutback of the torque is timed so that the two steps follow each other with an interval that corresponds to a half-period of the drive train oscillation. As explained previously, the period of the drive train oscillation (and thus the time interval between the steps in the torque) is different for the different gear levels of transmission of the vehicle.

Figure 10A:
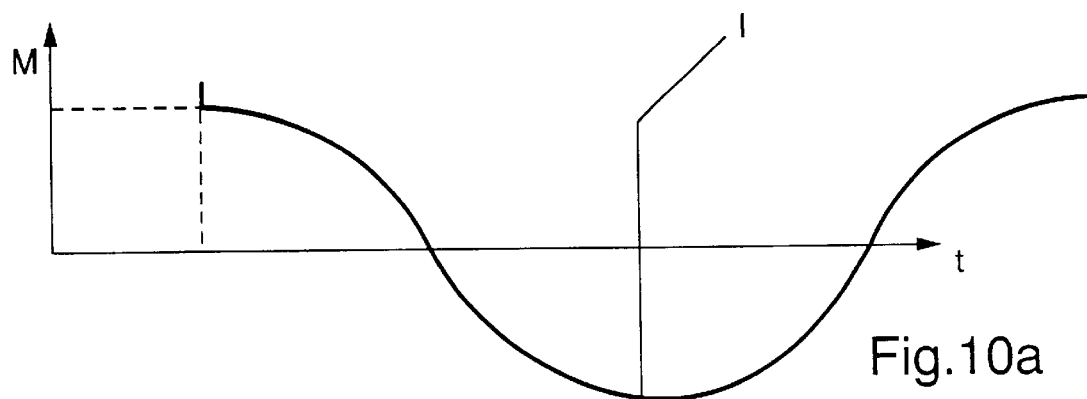
FIGS. 10a to 10d represent time graphs of the engine torque including a transient torsional oscillation.
Figure 10B:
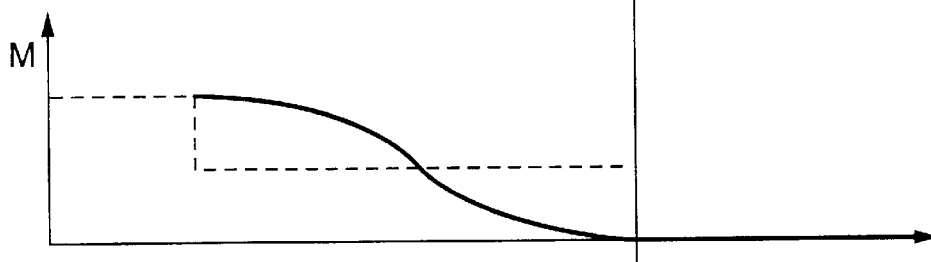

FIGS. 10a to 10d represent (in broken lines) different time graphs of stepwise cutbacks of the engine torque and (in solid lines) of the corresponding elastic bias torque. FIG. 10a illustrates the case of a single-step cutback of the engine torque. The solid line I that runs top to bottom from graph 10a to graph 10d represents the ideal point in time for cutting back the engine torque. FIG. 10b illustrates a correctly timed two-step cutback where the engine torque (broken line) is lowered to a first level at a certain point in time, then held constant at the first level, and lowered by a second step at the exact time of the half-period of the drive train oscillation.

Figure 10C:
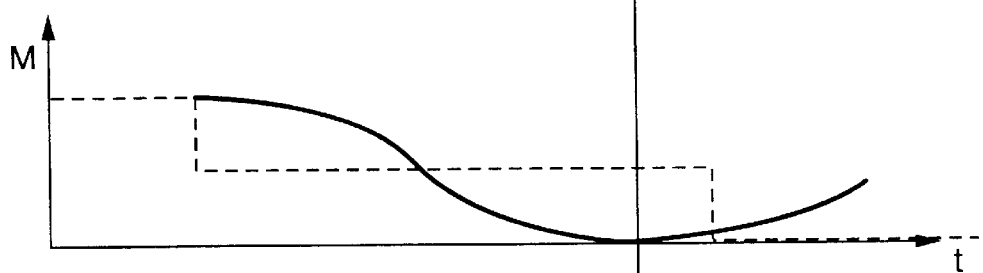
Figure 10D:
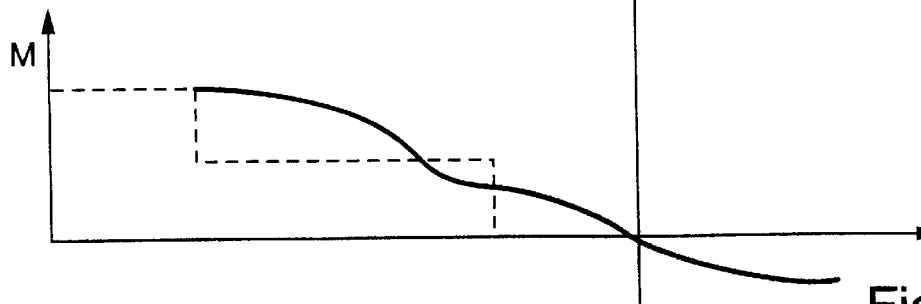

FIGS. 10c and 10d represent examples where the steps in cutting back the torque are poorly timed. In FIG. 10c, the second step occurs too late, while in FIG. 10d, it occurs too early. In general terms, with a poorly timed second step, the elastic bias torque is either already past or has not yet reached its minimum point in the oscillation cycle.

The advantageous point in time for performing the second step in cutting back acceleration or engine torque is determined on the basis of the half-period of the drive train oscillation specific to each gear level. Determining factors for the period or frequency of the drive train oscillation are, e.g., the aforementioned output-side elasticity of the drive train and the mass moment of inertia of the engine. For the lowest gear, the half-period of the drive train oscillation is around 200 milliseconds, and for the highest gear it is around 50 milliseconds.

The control device sends a target command to the engine for a cutback in torque before the time at which the actual cutback is to occur. This serves to compensate for the system-inherent time lag that has been described above. A part of the time lag, about 10 to 20 milliseconds, represents the time used for the processing and transfer of the signals.

A much larger part of the time lag is caused by the length of time it takes to change the aperture of the throttle valve of the engine. Since the throttle valve position is in a direct relationship to the engine torque, the change in position is larger for a larger cutback in engine torque. Even if the throttle valve is already closed, there is still a certain amount of combustible gas mixture in the intake area of the engine, so that a further contribution to the time lag comes from the length of time needed to evacuate the intake area. The evacuation is faster at higher rpm rates of the engine, so that the time required for evacuation is in the range of 100 to 200 milliseconds. Even after the intake area has been evacuated, there is still a certain amount of combustible mixture to be converted to the gas phase and burned in the engine, which prolongs the time interval in which the engine continues to produce torque by another 50 to 200 milliseconds, representing a further addition to the system-inherent time lag. The smallest contribution to the time lag, an amount of a few milliseconds, comes from the length of time that is needed to change the ignition timing.

System-inherent time lags occur both at the first step and at the second step of the cutback in engine torque. However, the time lag at the initiation of the first step change which lowers the acceleration to the first reduced level, has a larger range of variation than the time lag at the second step which lowers the acceleration to the second acceleration level. When the throttle valve is closed, the evacuation time is shorter and thus makes a less significant contribution to the time lag. The largest variations in the time interval needed for changing the aperture of the throttle valve occur in the range from about 70% to 100% of the maximum engine torque. The time for changing the throttle valve aperture is shorter and less subject to variations at engine torque levels between 0 and 70% of the maximum. The time needed to vaporize injected fuel is larger at the initiation of the first step, because fuel has been injected at an undiminished rate up to the beginning of the first step in the cutback of the engine torque.

Based on the aforementioned factors, the point in time for initiating the second step of the cutback in engine torque is advantageously determined as follows: After it has been established that a gear shift is to be performed, the control device issues a signal to the engine to initiate the first step in the cutback of the torque. The signal represents a command to the engine that serves to initiate the first step in the two-step cutback of the engine torque. After the control device has issued the command for the first step, it monitors the actual engine torque until the latter has fallen to a predetermined trigger level of, e.g., 80% of the original magnitude of the engine torque. In this monitoring phase, the engine torque can be calculated by the control device from existing signals such as the intake pressure, the rate of fuel injection, or other appropriate operating variables of the engine. After the trigger level has been reached, the control device adds a waiting period before issuing the command for the second of the two steps of the cutback in engine torque. The waiting period corresponds approximately to the half-period of the drive train vehicle oscillation which, as described above, is dependent on the gear level that the transmission is working in.

This procedure has the advantage that the time lag between the command and the actual occurrence has to be estimated only for the second step of the cutback. Because the time lag at the second step has a smaller range of variation than the time lag at the first step, the described procedure provides a more accurate timing of the second step. As a further advantage, variable factors that enter into the calculation of the engine torque such as, e.g., dirty air filters or varying temperature levels of the air taken in by the engine cannot have a negative effect on the control of the gear-shifting processes of the automated gear-shift transmission.

As was explained above in the context of FIG. 10, to achieve a comfortable gear-changing process in an automated gear-shift transmission, it is particularly important to synchronize the timing of the two steps in the cutback of the engine torque with the oscillatory behavior of the drive train. Following is a more detailed discussion of how the oscillatory behavior of the drive train is taken into account in the individual phases of reducing the torque, disengaging the clutch, and shifting out of the current gear. While the vehicle is being accelerated, the engine torque is transmitted through the engaged clutch, the transmission, and the components downstream of the transmission (i.e., the components that make up the output-side elasticity) to the wheels. The engine torque puts a torque bias on the output-side elasticity. For a given amount of engine torque, the resulting acceleration of the vehicle depends on which gear level the transmission is operating at. An analogous dependency applies to the drive train oscillations. In first gear, the drive train oscillation has the largest amplitude and at the same time the slowest frequency. The drive train oscillation in first gear typically has a frequency of about 1.5 to 3 Hz, most typically 2 Hz.

To perform the cutback in acceleration, the engine torque is lowered by way of the control device. The clutch remains engaged without slip during this phase. The drive train remains uninterrupted and elastically biased, exerting a torque on the engine that either reduces the rpm rate or at least causes the rpm rate to increase more slowly. The dynamic change in the drive train excites the resonance modes of the drive train oscillation. If the engine torque is cut back at a slow rate, i.e., if the time interval for the cutback is longer than the period of the drive train oscillation, there will be only a small oscillatory effect. However, if the engine torque is cut back at a fast rate, i.e., if the time interval for the cutback of the engine torque is shorter than the period of the drive train oscillation, the resulting oscillation will be stronger. If the drive train oscillation extends over a time interval longer than one-fourth of an oscillation period, it becomes uncomfortably noticeable.

This leads to the conclusion that there are two ways to keep drive train oscillations from interfering with the riding comfort of the vehicle. Either the time interval for cutting back the engine torque is kept longer than the period of the drive train oscillation for the currently operative gear level, or the drive train oscillation is prevented from lasting longer than one-fourth of a period, e.g., by a slipping engagement of the clutch, or by shifting the transmission out of the current gear.

To perform the gear shift, the clutch has to be taken out of engagement. During the disengagement, the clutch goes through a slipping phase, which generates chatter vibrations that propagate through the drive train of the vehicle. Disengaging the clutch changes the characteristics of the drive train as an oscillator. The first resonance mode of the drive train in this operating state is a chatter vibration of a frequency that is again dependent on the currently used gear level of the transmission, normally in a frequency range above 10 Hz. Whether or not a chatter resonance will be excited by the onset of clutch slippage depends on whether the output-side components are under an elastic torque bias at the time the slippage occurs. An elastic torque bias in the output-side components causes a change in the rpm rate of the clutch disc which is released into an oscillation that manifests itself as an uncomfortable jolt at the disengagement of the clutch if the oscillation is allowed to extend over more than one-fourth of a period.

The disengagement of the clutch is followed by the phase of shifting out of gear, where the clutch disc is uncoupled from the drive train, which causes an increase in the resonance frequency of the drive train. If the drive train is excited into oscillation in this state, the result is a clattering in the transmission which occurs if there is an elastic bias in the torque-transmitting components at the time the transmission is shifted out of gear. This leads to the conclusion that there should be no elastic bias torque in the output side of the drive train at the time when the transmission is shifted out of gear. This condition is met if the disengagement of the clutch is completed within one-fourth of a period of the chatter vibration.

Figure 11:
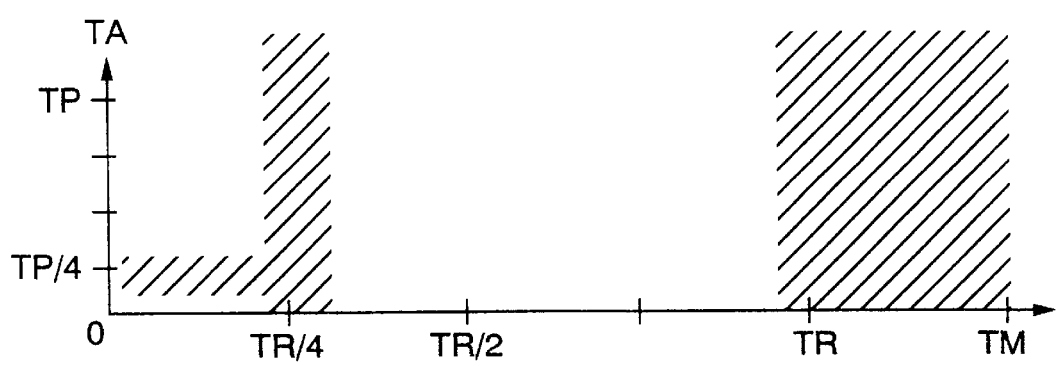
FIG. 11 represents a graph of the time windows to be observed for lowering the engine torque, disengaging the clutch, and shifting out of the current gear in a manner that avoids torsional oscillations or jolts.

The preceding discussion demonstrates that an automated gear-shift transmission has to run under a time control in order to achieve a comfortable gear-shifting process. The time interval for the two-step cutback in engine torque has to either correspond to one fourth of the period of the drive train oscillation for the currently used gear-level of the transmission, or else be longer than a full period of that oscillation. If a time interval smaller than one fourth of the oscillation period is used, it is necessary to satisfy the additional condition that the time interval for taking the clutch out of engagement needs to correspond to one fourth of the period of the chatter vibration (as defined above) for the currently used gear level. FIG. 11 illustrates these time constraints in the form of time windows represented by the diagonally shaded areas. The time scale TM on the abscissa represents the time from the first to the second step in cutting back the torque, and the time scale TA on the ordinate represents the amount of time used for taking the clutch out of engagement. The shaded areas represent the time windows for keeping the gear-changing process free from oscillations and jolts. The process includes the phases of cutting back the torque, taking the clutch out of engagement, and shifting the transmission out of gear. The time TM for cutting back the torque should be either longer than a full period TR of the drive train oscillation, or else about as long as one-fourth of the period TR. If the time interval TM for cutting back the torque is less than TR/4, which represents a fast cutback of the torque, then the additional time constraint needs to be met that the time interval TA for disengaging the clutch should be approximately equal to one-fourth of the period TP of the chatter vibration.

Figure 12:
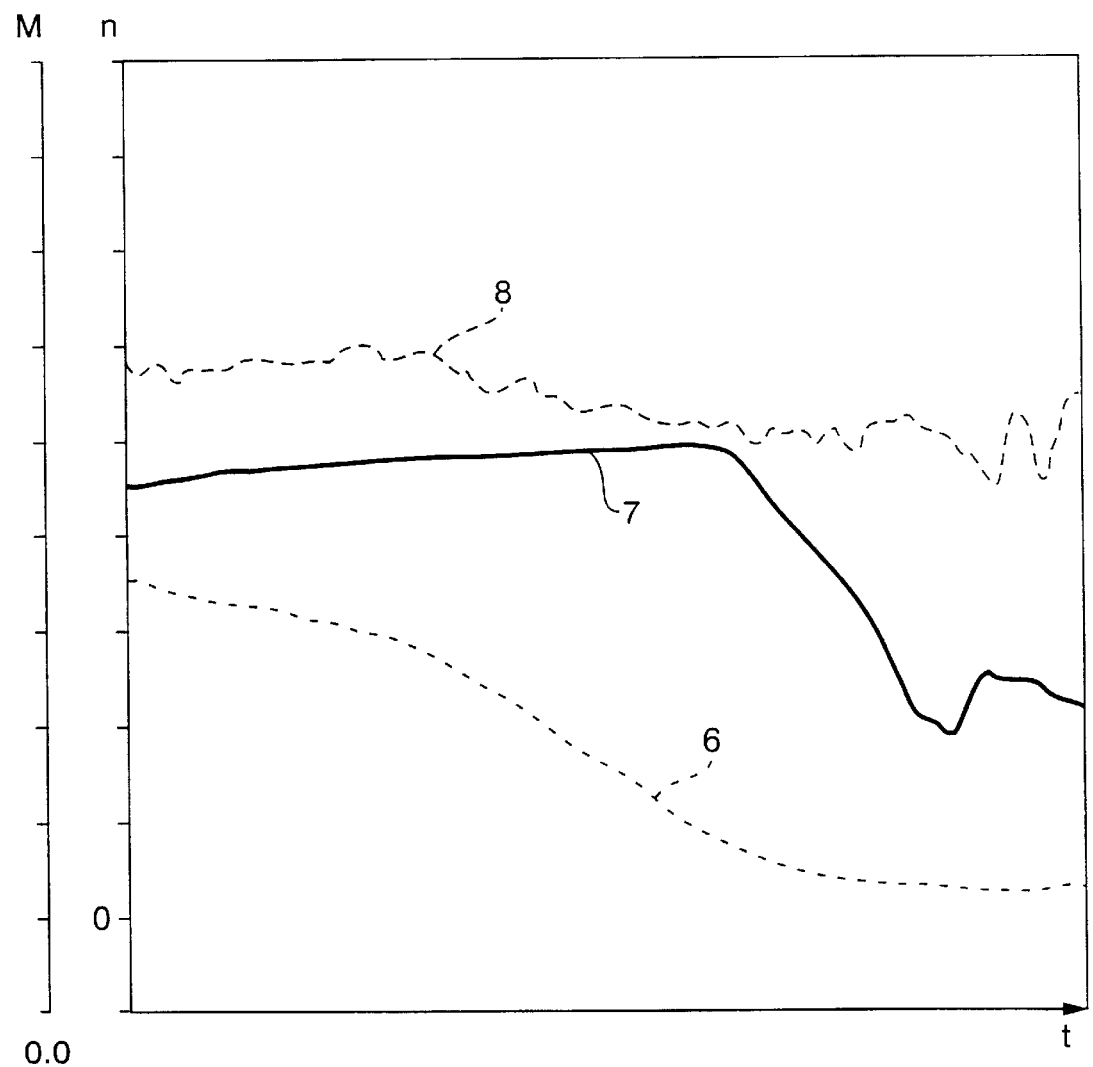
FIG. 12 represents a time graph of the engine torque, the transmission rpm rate and the acceleration during a gear change with an automated gear-shift transmission in a start-up travel phase under a partial torque load, to illustrate an application of the method according to the invention.
Figure 13:
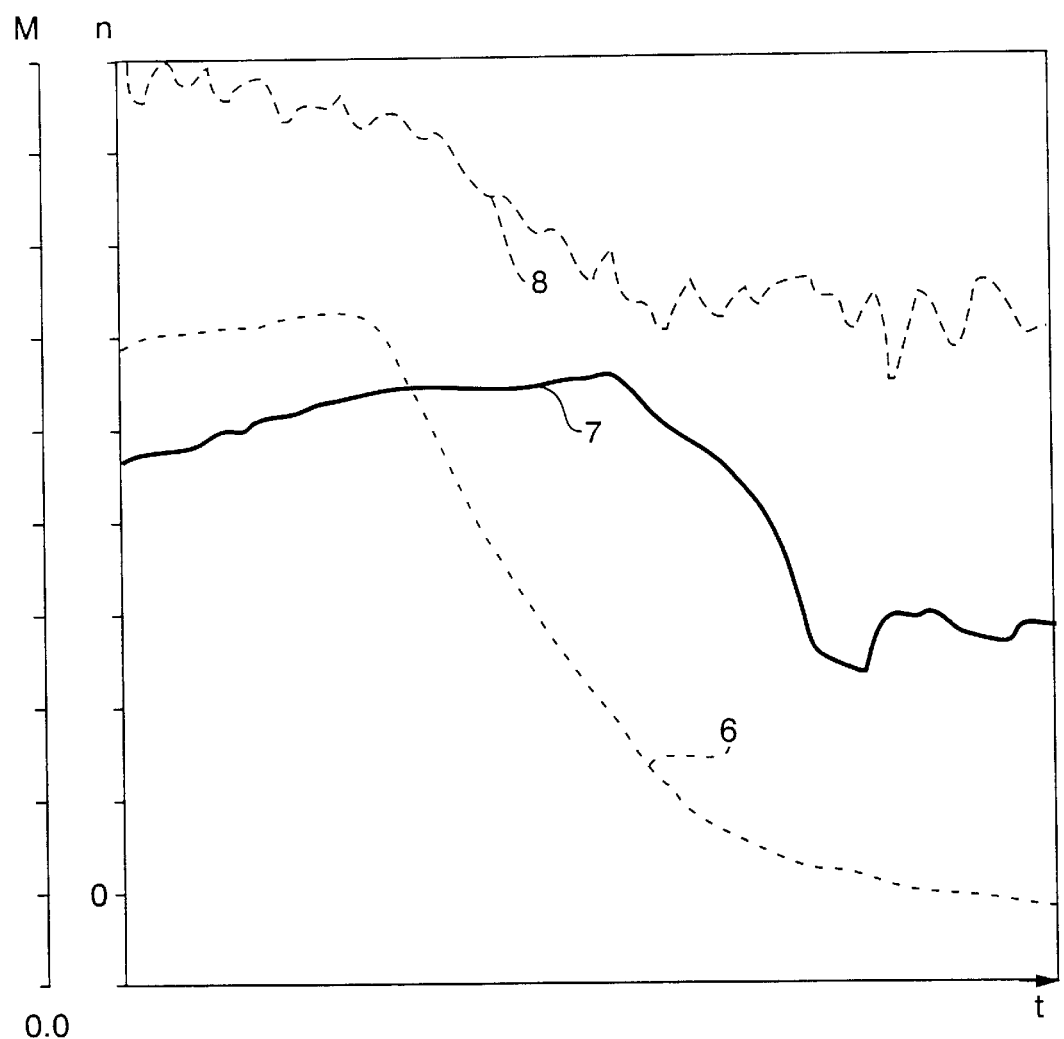
FIG. 13 illustrates a situation that is analogous to FIG. 12, except that the start-up takes place with a higher torque load.
Figure 14:
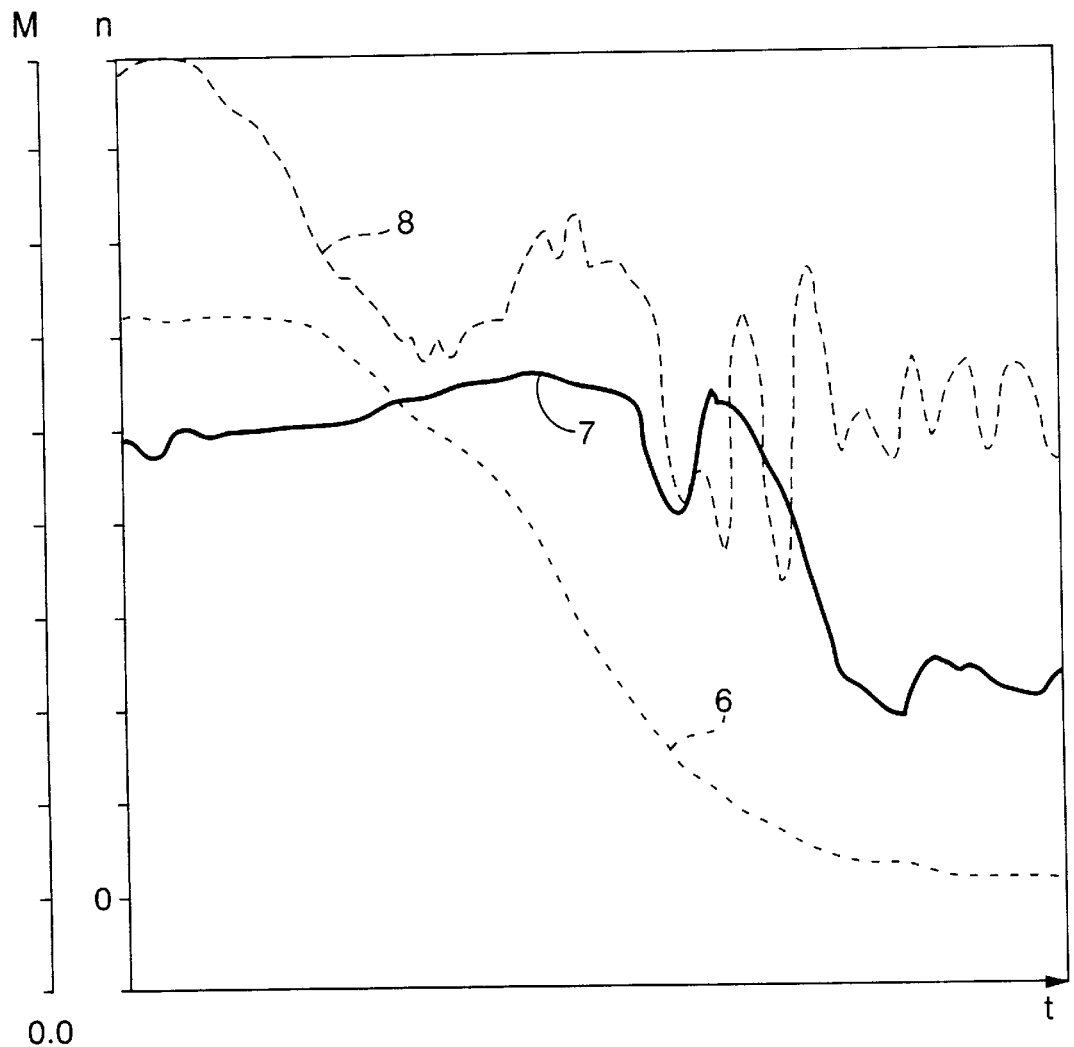
FIG. 14 represents a time graph of the engine torque, the transmission rpm rate and the acceleration for a gear-changing process that is analogous to FIG. 13, but is performed without using the method according to the present invention.

FIG. 12 shows a time graph of the engine torque 6, the transmission rpm rate 7, and an acceleration sensor signal 8 in a motor vehicle running in a mode of traction when an up-shift is performed according to the method of the present invention. The acceleration at the time 0 of the three analogous graphs of FIGS. 12, 13 and 14 represents a start-up acceleration of the vehicle in first gear. In comparison with FIGS. 13 and 14, the torque in FIG. 12 is lower, corresponding to a smaller start-up acceleration.

FIG. 12 shows an acceleration sensor signal 8 measured near the driver of a vehicle with an automated gear-shift transmission. As may be seen clearly, the acceleration sensor signal has no strong oscillations, especially in comparison to FIG. 14, even in the time phase where the transmission rpm rate 7 declines strongly from a previously level time profile. The transmission rpm rate 7 after the disengagement of the clutch shows a substantially linear decline. The acceleration sensor signal 8 does not exhibit a resonant response to a release of an elastic bias torque in the drive train at the time of clutch disengagement. In summary, FIG. 12 illustrates a case where the gear changing process runs in accordance with the time constraints explained above.

FIG. 13 gives an analogous representation of a start-up process at a higher level of acceleration as a result of a larger engine torque 6. In this case, too, the transmission rpm rate shows a substantially linear decline, and the acceleration sensor signal 8 does not exhibit a resonant response to a release of an elastic bias torque in the drive train at the time of clutch disengagement.

In contrast, FIG. 14 illustrates a case where a gear-shift was intentionally performed in an uncomfortable manner for demonstration purposes. As is evident from the time graphs, the acceleration sensor signal 8 of FIG. 14 is drastically different from the corresponding signals 8 of FIGS. 12 and 13. The acceleration sensor signal in FIG. 14 exhibits a pronounced excitation of high-frequency oscillations of the drive train, which was caused by selecting a longer time interval for disengaging the clutch, i.e., by violating the condition that the disengagement interval TA has to be comparable to about one fourth of the chatter-vibration period TP. In the representation of FIG. 14, the output side of the drive train was under an elastic bias torque which, on its release, excited a high-frequency mode of drive-train oscillations. The driver of a vehicle with an automated gear-shift transmission will experience these high-frequency resonant vibrations as a transmission clatter that interferes with the riding comfort of the vehicle.

It should be noted that the concepts of the present invention could also be applied to motor vehicles where the clutch is arranged downstream of the transmission in the drive train of the vehicle. Besides gear-shift transmissions (as defined elsewhere herein), the invention can also be embodied in a method and/or a motor vehicle where the transmission is a continuously variable transmission (CVT).

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

What is claimed is:

1. A method of controlling a motor vehicle with an engine, a clutch, a gear-shift transmission, and a control device; said control device being operable to detect when a gear shift is to be performed in the gear-shift transmission, said control device also being operable to detect a vehicle acceleration at which the motor vehicle is traveling, and said control device further being operable to change said vehicle acceleration to a different level; the method comprising the steps of:
   a) detecting when a gear shift is to be performed;
   b) detecting the vehicle acceleration; and
   c) prior to starting the gear shift, reducing the vehicle acceleration to a first acceleration level.

2. The method of claim 1, wherein during a predetermined time interval following step c) and prior to starting the gear shift, the first acceleration level is kept substantially constant.

3. The method of claim 1, wherein during a predetermined time interval following step c) and prior to starting the gear shift, the first acceleration level is kept within a range of variation not exceeding the vehicle acceleration detected in step b).

4. The method of claim 3, wherein the first acceleration level is temporarily cut back to near zero during a short time interval contained within said predetermined time interval and lasting between 50 and 100 milliseconds.

5. The method of claim 1, wherein after a predetermined time period following step c) and prior to starting the gear shift, the vehicle acceleration is reduced to a second acceleration level that is lower than the first acceleration level.

6. The method of claim 5, wherein the predetermined time interval is longer than 200 milliseconds.

7. The method of claim 6, wherein the predetermined time interval has a length between 200 and 600 milliseconds.

8. The method of claim 7, wherein the predetermined time interval has a length between 300 and 500 milliseconds.

9. The method of claim 1, wherein the first acceleration level is between 40% and 70% of the vehicle acceleration detected in step b).

10. The method of claim 1, wherein the control device is further operable to detect an engine torque delivered by the engine and to control said engine torque, and wherein in step c) the vehicle acceleration is reduced by controlling said engine torque.

11. The method of claim 10, wherein in step c) the controlling of said engine torque comprises reducing said engine torque to a first torque level that is lower than an engine torque corresponding to the vehicle acceleration detected in step b).

12. The method of claim 11, wherein during a predetermined time interval following step c) and prior to starting the gear shift, the control device keeps the first torque level substantially constant.

13. The method of claim 11, wherein during a predetermined time interval following step c) and prior to starting the gear shift, the control device imposes on the first torque level a controlled variation with a mean value that is lower than the engine torque corresponding to the vehicle acceleration detected in step b).

14. The method of claim 11, wherein said engine torque is reduced over a time interval of 200 to 800 milliseconds from a starting point of step c) to a starting point of the gear shift.

15. A motor vehicle with a control device that is operable to carry out the method of claim 1, said motor vehicle having a drive train that includes an engine, a gear-shift transmission, and an engageable and disengageable clutch between the gear-shift transmission and the engine, wherein the control device comprises means for detecting when a gear shift is to be performed in the gear-shift transmission, means for detecting a level of acceleration at which the motor vehicle is traveling, and means for reducing said acceleration to a first acceleration level.

16. The motor vehicle of claim 15, wherein the control device comprises means for keeping the first acceleration level substantially constant during a predetermined time interval following step c) and prior to starting the gear shift.

17. The motor vehicle of claim 15, wherein the control device comprises means for imposing on the first acceleration level during a predetermined time interval following step c) and prior to starting the gear shift a controlled variation with a mean value that is lower than the acceleration detected in step b).

18. The motor vehicle of claim 15, wherein the control device comprises means for reducing the acceleration after a predetermined time interval following step c) and prior to starting the gear shift to a second acceleration level that is lower than the first acceleration level.

19. The motor vehicle of claim 18, wherein the drive train can be excited into a drive train oscillation with a drive-train oscillation period, said drive-train oscillation period being specific to a gear level at which the transmission is operating; and wherein the predetermined time interval following step c) and prior to starting the gear shift is equal to one-half of the drive-train oscillation period.

20. The motor vehicle of claim 15, wherein the means for controlling the acceleration are designed to control said acceleration by controlling a torque delivered by the engine.

21. The motor vehicle of claim 15, wherein the means for controlling the acceleration are designed to control said acceleration by controlling a starting point of a combustion phase of the engine.

22. The motor vehicle of claim 15, wherein the means for controlling the acceleration are designed to control said acceleration by controlling a rate of fuel delivery to the engine.

23. The motor vehicle of claim 15, wherein the means for controlling the acceleration are designed to control said acceleration by controlling a rate of air intake of the engine.

24. The motor vehicle of claim 15, wherein the drive train can be excited into a drive train oscillation with a drive-train oscillation period, and the drive train can further be excited into a chatter vibration with a chatter-vibration period, said drive-train oscillation period and said chatter-vibration period being specific to a gear level at which the transmission is operating; wherein the control device comprises means for issuing a target command to the engine to lower the torque according to one of the modes (a), (b), (c), so that in mode (a), the predetermined time interval corresponds substantially to one-fourth of said drive-train oscillation period, in mode (b), the predetermined time interval is longer than said drive-train oscillation period, and in mode (c), the predetermined time interval is shorter than one-fourth of said drive-train oscillation period and a time interval for disengaging the clutch corresponds substantially to one-fourth of the chatter-vibration period.

25. The motor vehicle of claim 15, wherein the drive train can be excited into a drive train oscillation with a drive-train oscillation period, and the drive train can further be excited into a chatter vibration with a chatter-vibration period, said drive-train oscillation period and said chatter-vibration period being specific to a gear level at which the transmission is operating; wherein the control device comprises means for issuing a clutch command to the clutch-actuator device to disengage the clutch and for issuing an out-shift command to the transmission-actuator to shift the transmission out of gear in accordance with one of the modes (a), (b), (c), so that;

in mode (a), the predetermined time interval corresponds substantially to one-fourth of said drive-train oscillation period, whereupon the control device issues at least one of the clutch command and the out-shift command;

in mode (b), the predetermined time interval is longer than said drive-train oscillation period, whereupon the control device issues at least one of the clutch command and the out-shift command;

in mode (c), the predetermined time interval is shorter than one-fourth of said drive-train oscillation period, whereupon the control device issues the clutch command and, after a further time interval of substantially one-fourth of the chatter-vibration period, issues the out-shift command.

26. The motor vehicle of claim 15, wherein the gear-shift transmission is automated.

27. The motor vehicle of claim 26, comprising an indicator device to alert a driver when a gear shift is imminent.

28. The motor vehicle of claim 27, wherein the indicator device comprises at least one of a group that consists of acoustic, optical, and haptic indicator devices.

29. A method of controlling a motor vehicle by means of a control device; said motor vehicle having a drive train that includes an engine, a gear-shift transmission of a kind that has to be in a torque-free state to shift gears, and an engageable and disengageable clutch between the gear-shift transmission and the engine; the method comprising the steps of:

a) detecting when a gear shift is to be performed;
b) detecting an engine torque delivered by the engine;
c) prior to starting the gear shift, reducing the engine torque to a first torque level;
d) maintaining the first torque level for a predetermined time interval;
e) reducing the torque further after the predetermined time interval has elapsed; and
f) initiating the gear shift.

30. The method of claim 29, wherein reducing the torque in step c) causes a head-nodding movement in a driver of the vehicle, and wherein the predetermined time interval of step d) is selected so that the driver will have returned his head about halfway from the head-nodding movement when step e) is carried out.

31. The method of claim 29, wherein the predetermined time interval of step d) is established dependent on at least one dynamic property of the drive train.

32. The method of claim 31, wherein the at least one dynamic property comprises a drive train oscillation, said drive train oscillation having a drive-train oscillation period, and wherein the predetermined time interval of step d) is established dependent on said drive-train oscillation period.

33. The method of claim 32, wherein the predetermined time interval of step d) is established dependent on the engine torque detected in step b) and further dependent on substantially one-half of said drive-train oscillation period.

34. The method of claim 18, wherein the control device initiates step c) by sending to the engine a signal to reduce the torque to said first level dependent on the engine torque detected in step b) and further dependent on substantially one-half of said drive-train oscillation period.

35. The method of claim 29, wherein the control device causes the torque to be changed by sending a target command to the engine and the latter responds to the target command by reducing the torque to match the target, and wherein further the predetermined time interval of step d) is increased dependent on the engine torque detected in step b) to allow for a delay by which the response of the engine lags behind the target command.

36. The method of claim 29, wherein step e) occurs as a result of a further target command being sent to the engine by the control unit.

37. The method of claim 29, wherein the drive train includes a clutch-actuator device and the control device controls the clutch actuator device so that a torque-transmitting capacity of the clutch is adapted to follow the engine torque.

38. The method of claim 29, wherein drive train elements downstream of the transmission are subject to a variable elastic bias torque, wherein further the drive train includes a clutch-actuator device and the control device controls the clutch-actuator device so that the clutch is taken out of engagement at a time when said elastic bias torque is substantially zero.

39. The method of claim 29, wherein drive train elements downstream of the transmission are subject to a variable elastic bias torque, wherein further the drive train includes a transmission-actuator device and the control device controls the transmission-actuator device so that the gear-shift transmission is shifted out of gear at a time when said elastic bias torque is substantially zero.

40. A method of controlling a motor vehicle by means of a control device; said motor vehicle having a drive train that includes an engine, an automated gear-shift transmission with a transmission-actuator device, and an engageable and disengageable clutch with a clutch-actuator device between the automated gear-shift transmission and the engine; the method comprising the steps of:

a) detecting when a gear shift is to be performed;
b) detecting an engine torque delivered by the engine;
c) prior to starting the gear shift, reducing the torque to a first torque level;
d) maintaining the first torque level for a predetermined time interval;

e) reducing the torque further after the predetermined time interval has elapsed; and f) initiating the gear shift.

41. The method of claim 40, wherein the drive train can be excited into a drive train oscillation with a drive-train oscillation period, and the drive train can further be excited into a chatter vibration with a chatter-vibration period, said drive-train oscillation period and said chatter-vibration period being specific to a gear level at which the transmission is operating, and wherein the control device controls the engine in a manner meeting one of the conditions (a), (b), (c);

condition (a) requiring the predetermined time interval to correspond substantially to one-fourth of said drive-train oscillation period, condition (b) requiring the predetermined time interval to be longer than said drive-train oscillation period, and condition (c) requiring the predetermined time interval to be shorter than one-fourth of said drive-train oscillation period and simultaneously requiring a time interval for disengaging the clutch to correspond substantially to one-fourth of the chatter-vibration period.

42. The method of claim 40, wherein the drive train can be excited into a drive train oscillation with a drive-train oscillation period, and the drive train can further be excited into a chatter vibration with a chatter-vibration period, said drive-train oscillation period and said chatter-vibration period being specific to a gear level at which the transmission is operating, wherein the control device is operable to send a clutch command to the clutch-actuator device to disengage the clutch and to send an out-shift command to the transmission actuator to shift the transmission out of gear, and wherein the control device controls the engine in a manner meeting one of the conditions (a), (b), (c), so that;

under condition (a), the predetermined time interval corresponds substantially to one-fourth of said drive-train oscillation period, whereupon the control device issues at least one of the clutch command and the out-shift command;

under condition (b), the predetermined time interval is longer than said drive-train oscillation period, whereupon the control device issues at least one of the clutch command and the out-shift command;

under condition (c), the predetermined time interval is shorter than one-fourth of said drive-train oscillation period, whereupon the control device issues the clutch command and, after a further time interval of substantially one-fourth of the chatter-vibration period, issues the out-shift command.

43. The method of claim 40, wherein the drive train can be excited into a drive train oscillation with a drive-train oscillation period, said drive-train oscillation being specific to a gear level at which the transmission is operating, and wherein the predetermined time interval is substantially equal to one-half of the drive-train oscillation period.

* * * * *